United States Patent
Phan Huy et al.

(10) Patent No.: US 8,346,197 B2
(45) Date of Patent: Jan. 1, 2013

(54) METHOD OF DYNAMICALLY COMPENSATING A RELATIVE MOVEMENT OF A COMMUNICATING ENTITY

(75) Inventors: Dinh Thuy Phan Huy, Paris (FR); Man-Faï Wong, Montreuil (FR)

(73) Assignee: France Telecom, Paris (FR)

( * ) Notice: Subject to any disclaimer, the term of this patent is extended or adjusted under 35 U.S.C. 154(b) by 176 days.

(21) Appl. No.: 12/936,579

(22) PCT Filed: Apr. 9, 2009

(86) PCT No.: PCT/FR2009/050638
§ 371 (c)(1),
(2), (4) Date: Oct. 6, 2010

(87) PCT Pub. No.: WO2009/136091
PCT Pub. Date: Nov. 12, 2009

(65) Prior Publication Data
US 2011/0028101 A1 Feb. 3, 2011

(30) Foreign Application Priority Data
Apr. 11, 2008 (FR) ...................................... 08 52451

(51) Int. Cl.
H04B 7/00 (2006.01)
(52) U.S. Cl. ............... 455/277.1; 455/277.2; 455/552.1; 455/562.1; 455/575.7; 375/316
(58) Field of Classification Search ............... 455/277.1, 455/552.1, 562.1, 575.7, 277.2; 375/316
See application file for complete search history.

(56) References Cited

U.S. PATENT DOCUMENTS
6,349,119 B1 * 2/2002 Sogabe et al. ............... 375/316
6,784,826 B2 * 8/2004 Kane et al. ...................... 342/28

OTHER PUBLICATIONS

Jin et al., "Position Location by Time Reversal in Communication Networks," IEEE International Conference on Acoustics, Speech and Signal Processing, 2008, ICASSP 2009, IEEE, Piscataway, NJ, USA, pp. 3001-3004 (Mar. 31, 2008).
Tourin et al., "Time Reversal Telecommunications in Complex Environments," Comptes Rendus—Physique, Elsevier, Paris, France, vol. 7 (7), pp. 816-822 (Sep. 1, 2006).
Zetik et al., "Imaging of the Propagation Environment by UWB Channel Sounding," XXVIIIth URSI General Assembly, Ilmenau University of Technology, Dept. EEIT, Ilmenau, Germany, pp. 1-4, retrieved from internet website: http://www-emt.tu-ilmenau.de/EMTPub/uploads/pdf/N9543RIZEU.pdf (Sep. 29, 2005).
Zhou et al., "Assessment of MISO Time Reversal for Short-Range Communications in the 5GHz ISM Band," Wireless Personal Communications, Kluwer Academic Publishers, DO, vol. 43 (2), pp. 759-776 (Jun. 23, 2007).

* cited by examiner

*Primary Examiner* — Sanh Phu
(74) *Attorney, Agent, or Firm* — Drinker Biddle & Reath LLP

(57) ABSTRACT

A method of dynamically compensating a movement of a source communicating entity relative to a destination communicating entity comprising a set of destination antennas, an antenna data signal transmitted by a source antenna of the source communicating entity being pre-equalized by time reversing an estimated propagation channel between said source antenna and a reference destination antenna at a current time, the method comprising the iterative steps of the destination communicating entity estimating a current focus, estimating movement of the current focus, and selecting, for the next time period, a reference destination antenna for estimating the propagation channel and a target destination antenna for receiving said data signal.

11 Claims, 3 Drawing Sheets

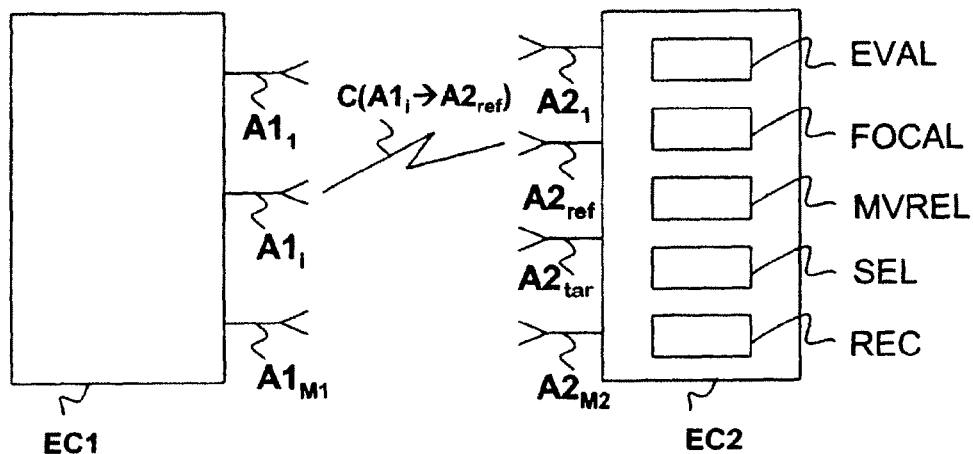
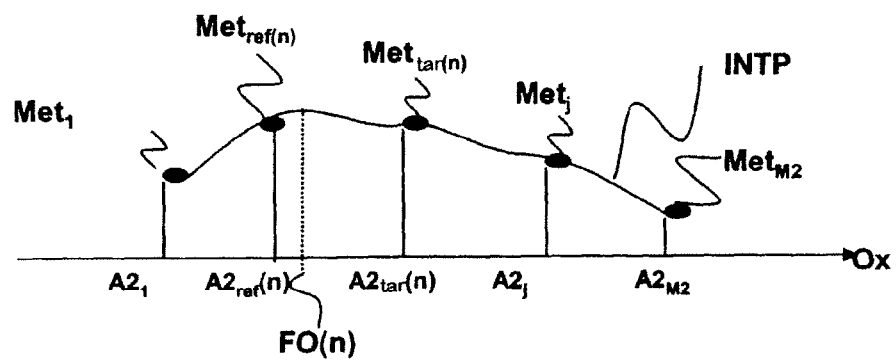
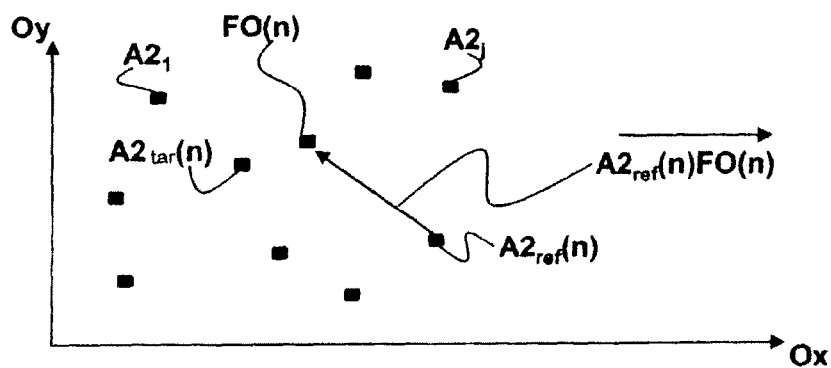

METHOD OF DYNAMICALLY COMPENSATING A RELATIVE MOVEMENT OF A COMMUNICATING ENTITY

CROSS-REFERENCE TO RELATED APPLICATIONS

This application is the U.S. national phase of the International Patent Application No. PCT/FR2009/050638 filed Apr. 9, 2009, which claims the benefit of French Application No. 08 52451 filed Apr. 11, 2008, the entire content of which is incorporated herein by reference.

FIELD OF THE INVENTION

The field of the invention is that of telecommunications and more precisely that of radio communication techniques between communicating entities.

BACKGROUND

The invention relates more particularly to using a time reversal technique to transmit a signal between two communicating entities including at least one transmit antenna and at least two receive antennas.

An antenna signal is a radio signal transmitted by an antenna of a communicating entity and is subject to distortion as a function of the propagation conditions between a source point defined at the output of the source antenna and a destination point defined at the input of an antenna of the destination communicating entity. To limit this distortion, the antenna signal is predistorted by applying pre-equalization coefficients as a function of the characteristics of the propagation channel between these two antennas. It is therefore necessary to characterize this propagation channel.

Of existing pre-equalization methods, methods using time reversal are distinguished by their reduced complexity, their high performance and their intrinsic capacity for focusing a radio wave onto a receive antenna. Time reversal makes it possible to reduce significantly the time dispersion of the propagation channel by focusing the energy of the received signal in time and in space.

Time reversal is a technique for focusing waves, typically acoustic waves, that relies on the invariance of the wave equation on time reversal. Thus a time-reversed wave propagates like a forward wave traveling back in time. A short pulse emitted from a source point propagates in a propagation medium. Part of this wave received by a destination point is time reversed before it is sent back in the propagation medium. The wave sent back converges toward the source point, where it forms a short pulse, and the energy of the wave is focused on the source point (focus). The shape of the signal focused on the source point by time reversal is virtually identical to that of the source signal emitted at the source point. Thus time recompression occurs at the focus. In particular, the more complex the propagation medium, the more precisely the time-reversed wave converges.

The time-reversal technique is therefore applied in radio communications networks to cancel the effect of the propagation channel on the antenna signal, notably by reducing the spreading of the channel, and to simplify the processing of symbols received after passing through the channel. The antenna signal emitted by an antenna of the source communicating entity is thus pre-equalized by application of coefficients obtained by time reversing the impulse response of the propagation channel that this antenna signal has to pass through. The time reversal of the propagation channel applied to the signal makes it possible to cancel the effect of this channel on transmission from the source point of the signal predistorted in this way and to focus the signal on a destination antenna. Time reversal therefore requires knowledge of the propagation channel by the source communicating entity.

In bidirectional time-division duplex (TDD) transmission, transmission in a first direction, for example from a source communicating entity to a destination communicating entity, and transmission in a second direction that is the opposite of the first direction are effected on the same carrier frequency and at different times. The propagation channel corresponding to the first direction is then substantially identical to the propagation channel corresponding to the second direction. A source communicating entity is therefore capable of estimating the propagation channel from the received signals.

In frequency-division duplex (FDD) bidirectional transmission, transmission in the first direction and transmission in the opposite direction are effected in different frequency bands. The source communicating entity's knowledge of the propagation channel corresponding to the first transmission direction may be obtained from an estimate of the propagation channel produced by the destination communicating entity, for example.

However, if the communicating entities are mobile, the channel estimate produced at a given time by a communicating entity may prove erroneous afterwards because of the mobility of the communicating entities. This error is qualified relative to a defined relative movement as a function of the movement of the source communicating entity as observed from the destination communicating entity. For large relative movements there is a decorrelation between the estimate of the propagation channel used to predistort the signal and the propagation channel that the signal actually experiences.

Accordingly, firstly the predistortion of the signal is inadequate and secondly the signal is not focused onto a destination antenna. The time-reversal pre-equalization technique therefore offers very poor performance for fast-moving communicating entities.

The paper entitled "From Theory to Practice: an overview of MIMO space-time coded wireless systems", by David Gesbert, Mansoor Shafi, Da-shan Shui, Peter J. Smith, and Ayman Naguid, published in the IEEE Journal on Selected Areas in Communication, Vol. 21, April 2003 expresses the effect of the relative movement as a function of wavelength, the propagation channel measurement period and delays between the measurement and the reception of the transmitted antenna signal. That paper then shows that the time-reversal technique can be used only for short propagation channel measurement periods and very short delays between the measurement and the reception of a signal pre-equalized as a function of the measurement.

One solution is to estimate the relative movement or to estimate the movement of the source communicating entity in order to use the time-reversal method or not. Thus European Patent application EP 0 109 533, entitled "A method and device for channel estimation in a mobile system, particularly in a mobile phone", proposes a channel estimation method including a step of estimating the movement of a mobile terminal. Depending on the estimated movement, the most suitable transmission technique is adopted, for example time reversal for a small movement and a transmission technique that does not require channel estimation for large movements.

That solution thus requires the use of two transmission modes in a communicating entity. Apart from the increase in complexity, the choice of the movement threshold or the relative movement enabling selection of the appropriate transmission mode is difficult because it is a function of the propagation context.

There is therefore a need for a method of dynamically compensating the movement of a source communicating entity relative to a destination communicating entity for transmitting a signal based on a time-reversal technique that is effective for a wide range of relative movements of the communicating entities. Below, the expression relative movement must be understood as referring to the movement of the source communicating entity as observed from the destination communicating entity.

SUMMARY

The invention is suited to communicating entities with at least one transmit antenna and at least two receive antennas. A communicating entity may be a mobile terminal, a radio access point, a terrestrial or satellite-base station or any equipment fitted with a communications card.

This solution is furthermore suited to communicating entities with a plurality of transmit antennas for which a signal is made up of a plurality of antenna signals, for example for MIMO (Multiple Input, Multiple Output) networks.

To achieve the above objective, the invention provides a method of dynamically compensating movement of a source communicating entity relative to a destination communicating entity including a set of destination antennas, an antenna data signal transmitted by a source antenna of the source communicating entity being pre-equalized by time reversing an estimated propagation channel between the source antenna and a reference destination antenna at a current time. The method includes the iterative steps of:

the destination communicating entity estimating a current focus;
estimating movement of the current focus;
selecting, for the next time period, a reference destination antenna for estimating the propagation channel and a target destination antenna for receiving said data signal.

Thus an antenna signal is focused onto a reference destination antenna but the data is reconstituted from the signal received by a target destination antenna. The target and reference antennas are selected iteratively by analyzing the movement of a focus and anticipation of the relative movement. This method therefore makes it possible to use the time-reversal pre-equalization technique for a wide range of relative movements by iterative adjustment of the reference destination antennas enabling estimation of the propagation channels and the target destination antennas for reconstituting the data.

The step of estimating the movement of the current focus is based on the positions at the current time of the current focus and the reference destination antenna.

The relative movement is simply estimated from received signals determining a focus. Thus no additional method of estimating movement based on estimates of the movement of the communicating entities is necessary.

The destination communicating entity estimates the current focus on the basis of a focusing vector of a focused signal transmitted by the source antenna and received by all the destination antennas.

Thus the focus is simply determined by analyzing a focused signal received by all the destination antennas.

The focusing vector represents a measurement of the quality of the focused signal received by all the destination antennas.

Thus the focusing vector is determined relative to the quality of the received signal, which makes it possible to optimize the operation of the signal receiver of the destination communicating entity, for example to guarantee a maximum bit rate or to reconstitute the data with minimum errors.

For the next time period, selection of the reference destination antenna and the target destination antenna is a function of an estimated position of a next focus based on the estimated movement of the current focus.

Selection for the next time period of the target destination antenna and the reference destination antenna minimizes a distance between the target destination antenna for the next time period and the estimated next focus.

The reference and target destination antennas are thus selected to obtain focusing onto the target antenna on the basis of a channel estimate relative to a reference antenna incorporating the movement of the focus.

Selecting the target antenna may also be a function of a geometric barycenter of all the destination antennas and makes it possible to concentrate the energy of the signal toward the center of the set of antennas of the destination communicating entity and thus to limit the dispersion of energy around the destination communicating entity.

The invention also provides a device for dynamically compensating a movement of a source communicating entity relative to a destination communicating entity including a set of destination antennas, an antenna data signal transmitted by a source antenna of the source communicating entity being pre-equalized by time reversing an estimated propagation channel between the source antenna and a reference destination antenna at a current time. The device includes:

means for estimating a current focus;
means for estimating a movement of the current focus;
means for selecting, for the next time period, a reference destination antenna for estimating the propagation channel and a target destination antenna for receiving said data signal.

The invention further provides a communicating entity of a radio communications system including at least one of the aforesaid devices for compensating movement of a source communicating entity relative to a destination communicating entity.

The invention further provides a radio communications system including at least one communicating entity of the invention.

The device, the communicating entity and the system have advantages analogous to those described above.

BRIEF DESCRIPTION OF THE DRAWINGS

Other features and advantages of the present invention become more clearly apparent on reading the following description of particular implementations of the invention provided by way of illustrative and non-limiting example only and from the appended drawings, in which:

FIG. 1 is a block schematic of a source communicating entity in communication with a destination entity of the invention;

FIG. 3 represents a configuration of aligned destination antennas;

FIG. 4 represents an example of movement of a focus for a configuration of destination antennas distributed in a plane;

DETAILED DESCRIPTION

Figure 2:
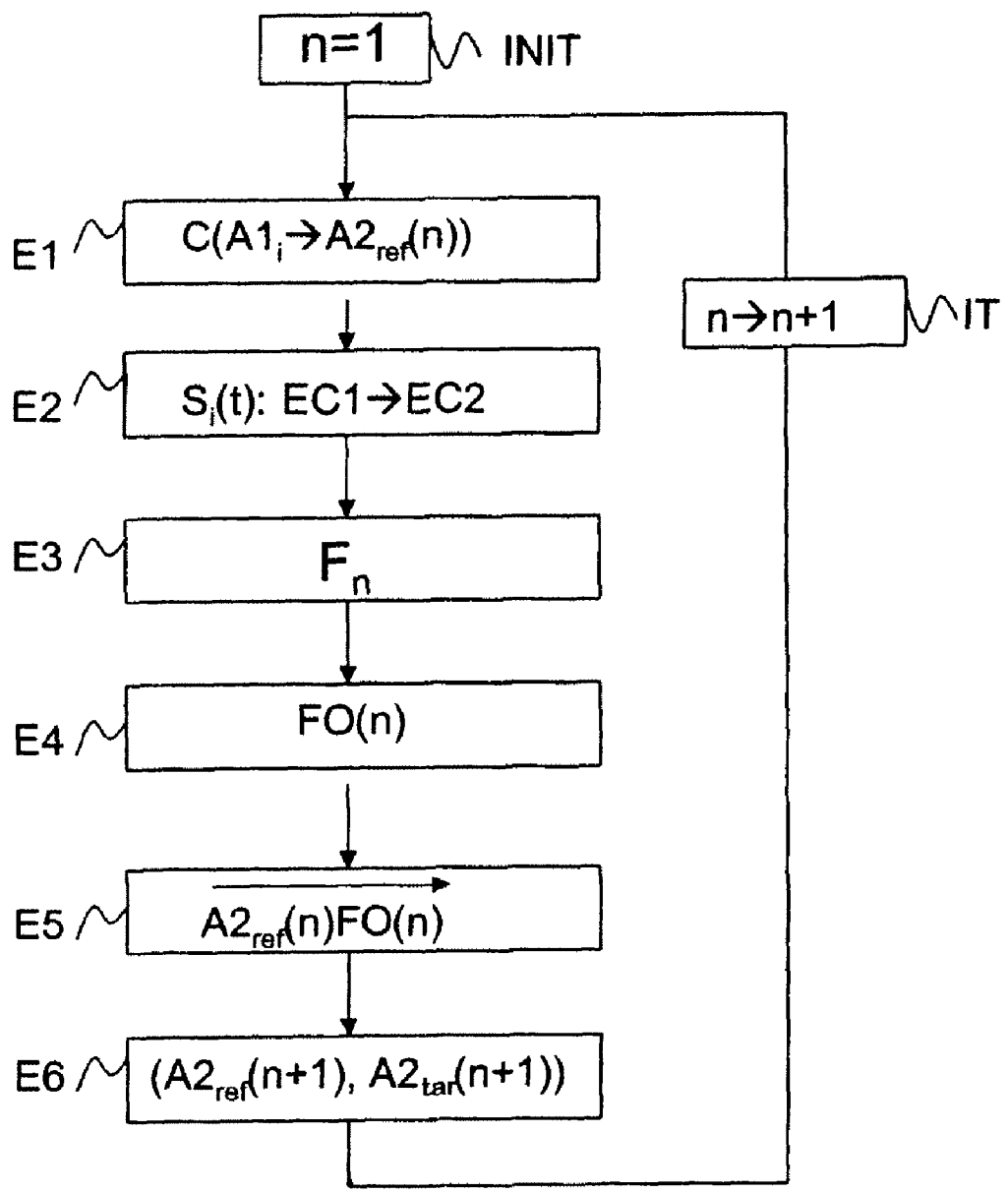
FIG. 2 represents the steps of the method of compensating relative movement of the source communicating entity of one particular implementation of the invention.

Referring to FIG. 1, a communicating entity EC1 is able to communicate with a destination entity EC2 via a radio communications network not represented in the figure.

For example, the radio communications network is a UMTS (Universal Mobile Telecommunications system) cellular radio communications network as defined by the 3GPP (3rd Generation Partnership Project) organization and evolutions thereof including 3GPP-LTE (LTE standing for "Long-Term Evolution").

The communicating entities may be mobile terminals, terrestrial or satellite base stations, access points or any equipment fitted with a communication card.

For clarity, the invention is described for the unidirectional transmission of a data signal from the communicating entity EC1 to a destination communicating entity EC2. The invention relates equally to bidirectional transmission.

The source communicating entity EC1 includes M1 source antennas ($A1_1, \ldots, A1_{M1}$) with M1 greater than or equal to 1. The destination communicating entity includes M2 antennas ($A2_1, A2_{ref}, \ldots, A2_{tar}, \ldots, A2_{M2}$) with M2 greater than or equal to 2.

The source communicating entity EC1 is adapted to transmit a data signal consisting of one or more antenna signals to the destination communicating entity EC2. Such antenna signals are defined on the basis of binary data by methods of modulation, coding, and distribution between the M1 antennas, as described for example in the paper "Space block coding: A simple transmitter diversity technique for wireless communication" by S. Alamouti, published in IEEE Journal on Selected Areas in Communications, vol. 16, pp. 1456 to 1458, October 1998.

The destination communicating entity EC2 is adapted to receive the data signal via a target antenna $A2_{tar}$ of the set of destination antennas and to reconstitute the data from the received signal.

An antenna signal transmitted by the source antenna $A1_i$, for i varying from 1 to M1, is prefiltered by applying coefficients of a time-reversed estimated impulse response. The impulse response represents the propagation channel $C(A1_i \rightarrow A2_{ref})$ between the source antenna and a reference destination antenna $A2_{ref}$.

TDD transmission in a first direction, for example from the source communicating entity to the destination communicating entity, and in a second direction opposite the first direction are effected on the same carrier frequency at different times. The impulse response of the propagation channel is conventionally estimated by the source communicating entity on the basis of an analysis of the signals transmitted in the second direction.

FDD transmissions in the first direction and in the opposite direction are effected in separate frequency bands. The source communicating entity's knowledge of the propagation channel corresponding to the first transmission direction may be obtained from an estimate of the propagation channel effected by the destination communicating entity, for example.

Thus, depending on the transmission mode concerned, either the source communicating entity or the destination communicating entity estimates a propagation channel between a source antenna and a reference destination antenna. If this estimation is effected by the destination communicating entity, said entity is adapted to deliver to the source communicating entity either the estimate or pre-equalization coefficients obtained by time-reversing the estimate.

FIG. 1 shows only means included in the destination communicating entity that relate to the invention.

The destination entity further includes a central control unit, not shown, that is connected to the means included in the entity and that is adapted to control the operation of those means.

The destination communicating entity includes:
a focusing evaluator EVAL adapted to determine a focusing vector from a focused signal transmitted by the source communicating entity and received at each antenna of the destination communicating entity; a component of the focusing vector is obtained by measuring the quality of the signal received at a destination antenna;
a focus estimator FOCAL adapted to estimate a current focus on the basis of the focusing vector delivered by the evaluator EVAL;
an estimator MVREL of the movement of the current focus;
an antenna selector SEL adapted to select a reference destination antenna and a target destination antenna for the next time period; the antenna signals transmitted by the source communicating entity are pre-equalized by time-reversing the estimated impulse responses between the source antennas and the reference antenna;
a receiver REC adapted to reconstitute the data from a data signal received at the target destination antenna.

The various means of the destination communicating entity may be implemented by analog or digital techniques familiar to the person skilled in the art. The operation of the means described above is described in detail below when describing the method of dynamically compensating the relative movement of a source communicating entity.

One particular example of use of the method is described below with reference to FIG. 2.

The method is iterated as a function of a configurable iteration frequency $F_{iter}$. During transmission of data from the source communicating entity EC1 to the destination communicating entity EC2, the iteration frequency $F_{iter}$ is determined as a function of the frequency of obtaining an effective channel estimate. If no data is transmitted between the communicating entities, the iteration frequency $F_{iter}$ is determined in order to maintain the knowledge of the antenna pair comprising the reference destination antenna and the target destination antenna and to be ready for subsequent transmission of data. The iterations are symbolized by an iteration step IT with suffix n. A preliminary initialization step INIT corresponds to the index n=1.

During the initialization step INIT, the destination communicating entity selects from all the destination antennas a reference destination antenna $A2_{ref}(n)$ and a target destination antenna $A2_{tar}(n)$.

The reference destination antenna that corresponds to the $n^{th}$ iteration of the method is denoted $A2_{ref}(n)$ and the target destination antenna is denoted $A2_{tar}(n)$.

In the step E1, the source communicating entity determines pre-equalization coefficients to be applied to a data signal or to a reference signal made up of M1 antenna signals. The pre-equalization coefficients applied to an antenna signal $S_i(t)$ of the data or reference signal transmitted by a source antenna $A1_i$ at a current time t, for i varying from 1 to M1 are given by time-reversing an estimated impulse response of the propagation channel $C(A1_i \rightarrow A2_{ref}(n))$ between a source antenna $A1_i$ and a reference destination antenna $A2_{ref}(n)$.

This determination may be effected, for example, by the source or destination communicating entity transmitting pulses or pilots, respectively, followed by the destination or source communicating entity, respectively, estimating the propagation channel depending on the FDD or TDD transmission mode, respectively. If a propagation channel is estimated by the destination communicating entity, said entity delivers the estimate to the source communicating entity.

In the step E2, the source communicating entity transmits the data signal or the reference signal, referred to as the focused signal, obtained by prefiltering each of the antenna signals $S_i(t)$ using the pre-equalization coefficients determined in the step E1.

In the step E3, the focusing evaluator EVAL of the destination communicating entity determines a focusing vector $F_n = (Met_1, \ldots, Met_{ref(n)}, \ldots, Met_{tar\ (n)}, \ldots, Met_{M2})$ on the basis of the focused signal transmitted by the source communicating entity and received by each antenna of the destination communicating entity. A component $Met_i$ of the focusing vector $F_n$, $F_n$ including M2 components is given by measuring the quality of the focused signal received by the destination antenna $A2_i$. The component $Met_{tar}(n)$ corresponds to the target destination antenna of the nth iteration and the component $Met_{ref\ (n)}$ corresponds to the reference destination antenna of the nth iteration.

The quality of the received focused signal may be measured by measuring the energy of the received signal, the instantaneous bit rate of the signal, the signal-to-noise ratio S/N or the signal-to-interference ratio S/I or a data error rate, for example, although this is not limiting on the invention.

In the step E4, the focus estimator FOCAL of the destination communicating entity estimates a focus FO(n) from the focusing vector $F_n$. The focus may be estimated by any method of determining a maximum point of a spatial function estimated from samples. The focus thus corresponds to the maximum of a spatial function estimated by linear, surface or volumetric interpolation of the measurements of the focusing vector $F_n$, for example.

The focus is determined from (X, Y) coordinates of the destination antennas, for example. FIG. 3 represents an installation configuration of the destination antennas aligned with a straight line segment of an axis Ox. FIG. 4 represents an installation configuration of the destination antennas in the plane of the axes Ox and Oy.

Referring to FIG. 3, for destination antennas $A2_j$, for j varying from 1 to M2, situated on a straight line segment, the focus FO(n) is determined by the coordinate on this straight line segment of the maximum of an interpolation function INTP, for example. The interpolation function is determined on the basis of the quality measurements $Met_j$ of the focused signal received by each destination antenna $A2_j$, for j varying from 1 to M2. FIG. 3 also shows a position of the target destination antennas $A2_{ref}(n)$ and reference destination antennas $A2_{tar}(n)$.

Alternatively, the focus is determined by the position of the destination antenna giving the maximum quality measurement.

Note that in the absence of relative movement of the source communicating entity, the focus FO(n) corresponds to the reference destination antenna $A2_{ref}(n)$. The antenna signal $S_i(t)$ is focused onto the destination antenna $A2_{ref}(n)$ by time-reversing the impulse response of the channel $C(A1_i \rightarrow A2_{ref}(n))$. Conversely, if there is relative movement, the focus no longer corresponds to the reference antenna $A2_{ref}(n)$.

In the step E5, the focus movement estimator MVREL of the destination communicating entity determines the movement of the focus FO(n) from the positions of the focus FO(n) and the reference destination antenna $A2_{ref}(n)$. Referring to FIG. 4, the movement of the focus is shown by the movement vector $\overrightarrow{A2_{ref}(n)FO(n)}$ for a planar distribution of the destination antennas. The movement vector is the zero vector if the focus corresponds to the reference antenna $A2_{ref}(n)$, i.e. in the absence of relative movement.

In the step E6, the antenna selector SEL of the destination communicating entity selects for the next iteration of the method from all the destination antennas a reference destination antenna $A2_{ref}(n+1)$ and a target destination antenna $A2_{tar}(n+1)$. This selection is effected in order to compensate the relative movement of the source communicating entity.

The reference and target antennas are selected to minimize a distance between the target antenna $A2_{tar}(n+1)$ and the estimated position of the focus on the next iteration. The estimated position $FO_{est}(n+1)$ of the focus on the next iteration n+1 is given by the coordinate corresponding to the movement vector applied to the selected reference antenna $A2_{ref}(n+1)$.

The reference and target destination antennas are therefore selected to minimize the distance between the target antenna $A2_{tar}(n+1)$ and the estimated focus on the next iteration (next focus), where:

$$FO_{est}(n+1) = A2_{ref}(n+1) + \overrightarrow{A2_{ref}(n)FO(n)}$$

The reference and target antennas can therefore be selected by any optimization method familiar to the person skilled in the art.

By way of illustrative example, the target destination antenna $A2_{tar}(n+1)$ is any antenna of the set of destination antennas chosen at random or fixed arbitrarily, for example. The estimated position of the next focus is determined for all the destination antennas $A2_k$, for k between 1 and M2, and defined by the equation:

$$FO_{est}(n+1) = A2_k + \overrightarrow{A2_{ref}(n)FO(n)}$$

The selected reference destination antenna $A2_{ref}(n+1)$ is then the destination antenna $A2_k$, for k between 1 and M2, which minimizes the distance between the target destination antenna $A2_{tar}(n+1)$ and the estimated position of the next focus $FO_{est}(n+1)$ determined on the basis of that destination antenna $A2_k$.

Alternatively, the estimated position of the next focus is determined for a subset of the destination antennas $A2_k$.

Alternatively, the selected target destination antenna $A2_{tar}(n+1)$ is the destination antenna nearest the geometric barycenter of the set of destination antennas. The selected reference destination antenna $A2_{ref}(n+1)$ is likewise the antenna $A2_k$, for k between 1 and M2, which minimizes the distance between the target destination antenna $A2_{tar}(n+1)$ and the estimated position of the next focus $FO_{est}(n+1)$ determined on the basis of that destination antenna $A2_k$.

Figure 5:
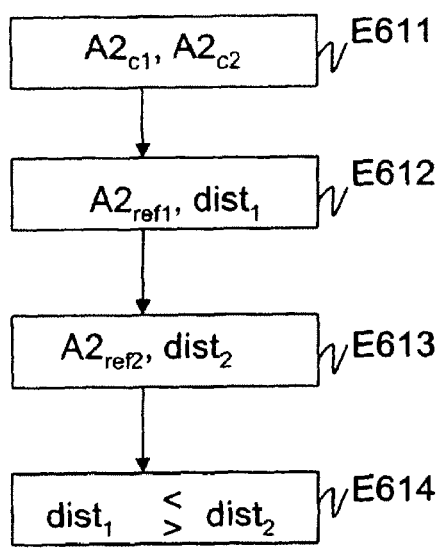
FIG. 5 represents the substeps of selecting destination antennas in one particular implementation.

Alternatively, the target and reference destination antennas are selected conjointly, the target destination antenna being also close to the geometric barycenter of the set of destination antennas. Selection may then be effected, for example, by executing the antenna selection substeps shown in FIG. 5.

During a step E611, the antenna selector of the destination communicating entity selects the two target destination antennas $A2_{c1}, A2_{c2}$ closest to the geometric barycenter of the set of destination antennas.

During a step E612, the antenna selector of the destination communicating entity selects a first reference destination antenna $A2_{ref1}$ that minimizes a distance $dist_1$. The distance evaluated is the distance $dist_1$ between the target antenna $A2_{c1}$ and the estimated position of the next focus $FO_{est}(n+1)$ determined from the antenna $A2_{ref1}$.

During a step E613, the destination communication entity selector selects a second reference destination antenna $A2_{ref2}$ which minimizes a distance $dist_2$. The distance evaluated is the distance $dist_2$ between the target antenna $A2_{c2}$ and the estimated position of the next focus $FO_{est}(n+1)$ determined from the antenna $A2_{ref2}$.

During the step E614, if the distance $dist_1$ is greater than or equal to the distance $dist_2$, the selected reference destination antenna $A2_{ref}(n+1)$ is the antenna $A2_{ref2}$ and the selected target destination antenna $A2_{tar}(n+1)$ is the antenna $A2_{c2}$. If not, the selected reference destination antenna $A2_{ref}(n+1)$ is the antenna $A2_{ref1}$ and the selected target destination antenna $A2_{tar}(n+1)$ is the antenna $A2_{c1}$.

Figure 6:
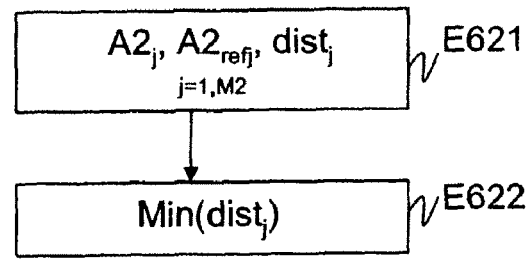
FIG. 6 represents the substeps of selecting destination antennas in a second particular implementation.

Alternatively, the target and reference destination antennas are selected conjointly, the target destination antenna capable of being far from the geometric barycenter of the set of destination antennas. Selection may then be effected by executing the antenna selection substeps shown in FIG. 6, for example.

During a step E621, for each destination antenna $A2_j$, for j varying from 1 to M2, the communicating entity antenna selector selects a reference destination antenna $A2_{refj}$ to minimize the distance $dist_j$ between the destination antenna $A2_j$ and the estimated position of the next focus $FO_{est}(n+1)$ determined from the antenna $A2_{refj}$.

During the step E622, the destination communicating entity determines the index j, for j varying from 1 to M2, to minimize the distance $dist_j$. Thus the selected reference destination antenna $A2_{ref}(n+1)$ is the antenna $A2_{refj}$ and the selected target destination antenna $A2_{tar}(n+1)$ is the antenna $A2_j$.

After selection of the antenna pair $A2_{ref}(n+1)$ and $A2_{ref}(n+1)$ during the step E6 of the relative movement compensation method, steps E1 to E6 are executed with this new antenna pair. Accordingly, the receiver REC of the destination communicating entity receives and reconstitutes the data from a signal received by the target destination antenna $A2_{tar}(n+1)$, the antenna signals being pre-equalized by time-reversing the estimated impulse responses of the propagation channels $C(A1_i \rightarrow A2_{ref}(n+1))$ between the source antennas $A1_i$ and the reference destination antenna $A2_{ref}(n+1)$, for i varying from 1 to M1.

In one particular embodiment of the invention, the destination communicating entity is adapted to receive signals via some of the destination antennas defining a set of target destination antennas and to reconstitute the data from the received signals. The steps of the method are then executed for each target destination antenna of the set of target destination antennas, a reference destination antenna being associated with each target destination antenna.

The method may equally be used for bidirectional transmission. In this particular embodiment of the invention, the method is implemented in both transmission directions, with the result that signals are not transmitted simultaneously in both transmission directions.

The invention described here relates to a method executed in a destination communicating entity for dynamically compensating the relative movement of a source communicating entity in communication with the destination communicating entity. Consequently, the invention applies equally to a computer program, notably a computer program stored on or in an information storage medium, adapted to implement the invention. This program may use any programming language and take the form of source code, object code or a code intermediate between source code and object code, such as a partially compiled form, or any other form desirable for implementing those of the steps of the method of the invention executed in the destination communication entity.

The invention claimed is:

1. A method of dynamically compensating movement of a source communicating entity relative to a destination communicating entity comprising a set of destination antennas, an antenna data signal transmitted by a source antenna of the source communicating entity being pre-equalized by time reversing an estimated propagation channel between said source antenna and a reference destination antenna at a current time;
said method comprising the iterative steps of:
estimating, by the destination communicating entity, a current focus;
estimating movement of the current focus;
selecting, for a next time period, a reference destination antenna for estimating the propagation channel and a target destination antenna for receiving said data signal.

2. The method according to claim 1, wherein the step of estimating the movement of the current focus is based on the positions at the current time of the current focus and the reference destination antenna.

3. The method according to claim 1 further comprising:
estimating, by the destination communicating entity, the current focus on the basis of a focusing vector of a focused signal transmitted by the source antenna and received by all the destination antennas.

4. The method according to claim 3, wherein the focusing vector represents a measurement of the quality of the focused signal received by all the destination antennas.

5. The method according to claim 1, wherein the selection for the next time period of the reference destination antenna and the target destination antenna is a function of an estimated position of a next focus based on the estimated movement of the current focus.

6. The method according to claim 5, wherein selection of the target destination antenna is furthermore a function of a geometric barycenter of all the destination antennas.

7. The method according to claim 5, wherein the selection for the next time period of the target destination antenna and the reference destination antenna minimizes a distance between the target destination antenna for the next time period and the estimated next focus.

8. A device for dynamically compensating a movement of a source communicating entity relative to a destination communicating entity comprising a set of destination antennas, an antenna data signal transmitted by a source antenna of the source communicating entity being pre-equalized by time reversing an estimated propagation channel between said source antenna and a reference destination antenna at a current time, said device comprising means for:
estimating a current focus;
estimating a movement of the current focus;
selecting, for the next time period, a reference destination antenna for estimating the propagation channel and a target destination antenna for receiving said data signal.

9. A communicating entity of a radio communications system comprising at least one device according to claim 8.

10. A radio communications system comprising at least one communicating entity according to claim 9.

11. A non-transitory computer program product for a communicating entity containing software instructions for commanding the execution by said entity of those of the steps of the method according to claim 1 when the program is executed by the communicating entity.

* * * * *